(12) United States Patent
Masuda et al.

(10) Patent No.: US 7,148,423 B2
(45) Date of Patent: Dec. 12, 2006

(54) PHASE SPLIT STRUCTURE OF MULTIPHASE SUPERCONDUCTING CABLE

(75) Inventors: Takato Masuda, Osaka (JP); Hiroyasu Yumura, Osaka (JP); Yoshihisa Takahashi, Tokyo (JP); Shoichi Honjo, Tokyo (JP); Keisuke Etoh, Toyo (JP)

(73) Assignees: Sumitomo Electric Industries, Ltd, Osaka (JP); The Tokyo Electric Power Company Incorporated, Tokyo (JP)

( * ) Notice: Subject to any disclaimer, the term of this patent is extended or adjusted under 35 U.S.C. 154(b) by 124 days.

(21) Appl. No.: 10/862,340

(22) Filed: Jun. 8, 2004

(65) Prior Publication Data

US 2004/0256144 A1   Dec. 23, 2004

(30) Foreign Application Priority Data

Jun. 19, 2003   (JP)   ............... 2003-174666

(51) Int. Cl.
*H01B 12/00*   (2006.01)
(52) U.S. Cl. ................. 174/125.1; 174/15.4; 174/15.5
(58) Field of Classification Search ............. 174/125.1, 174/15.4, 15.5
See application file for complete search history.

(56) References Cited

U.S. PATENT DOCUMENTS

| 6,049,036 | A | 4/2000 | Metra | |
| 2004/0173365 | A1 | 9/2004 | Hirose et al. | |
| 2005/0061537 | A1* | 3/2005 | Yumura et al. | 174/125.1 |
| 2005/0217878 | A1* | 10/2005 | Ashibe et al. | 174/15.5 |

FOREIGN PATENT DOCUMENTS

| CN | 1095232 C | 11/2002 |
| EP | 0 780 925 A1 | 6/1997 |
| EP | 1 411 609 A1 | 4/2004 |
| JP | 0780926 | * 6/1997 |
| JP | 2003-009330 | * 1/2003 |

OTHER PUBLICATIONS

Patent Abstracts of Japan, vol. 2003, No. 05, May 12, 2003 & JP 2003 009330A (Abstract Only).
Iizuka et al., "Mono-core Cable's Sheath Potential and Sheath Loss and Measures Against the Same", Power Cable Technology Handbook, New Edition, Mar. 25, 1989, partial translation, pp. 645-648.

* cited by examiner

*Primary Examiner*—Kamand Cuneo
*Assistant Examiner*—Yuriy Semenenko
(74) *Attorney, Agent, or Firm*—Foley & Lardner LLP

(57) ABSTRACT

A phase split structure of a superconducting cable includes three cable cores each having a shield layer provided around a superconductor, a splitter box housing the three cable cores extending from an assembly portion where the three cable cores are assembled into the cable, in a state in which the cable cores are spaced apart from each other, and a shield connecting portion connecting respective shield layers of the cable cores to each other within the splitter box. The shield connecting portion allows the cable cores to have their respective shield layers connected together with low resistance and each shield layer can pass a current substantially equal in magnitude to that which each superconductor passes. Thus in each shield layer a magnetic field can be formed having a level that can cancel a magnetic field generated from each superconductor. The structure can thus effectively prevent a large magnetic field external to the cable core.

2 Claims, 5 Drawing Sheets

← TO SPLIT TERMINATION   TO ASSEMBLY PORTION →

PHASE SPLIT STRUCTURE OF MULTIPHASE SUPERCONDUCTING CABLE

BACKGROUND OF THE INVENTION

1. Field of the Invention

The present invention relates to a split structure for splitting a multiphase superconducting cable constructed of a plurality of cable cores into respective segments containing the cores. In particular, the present invention relates to a phase split structure of a multiphase superconducting cable to minimize or nullify a magnetic field that could be generated outside each cable core.

2. Description of the Background Art

As one of superconducting cables that have been produced using a superconductor formed of a Bi-based high-temperature superconducting tape for example, a multiphase superconducting cable of multicore type that is produced by assembling a plurality of cable cores into one unit is under development. FIG. 5 shows a 3-phase superconducting cable of 3-core type in cross section. This superconducting cable 100 includes three cable cores 102 twisted and housed in a thermal insulation pipe 101.

Thermal insulation pipe 101 has an outer pipe 101a and an inner pipe 101b. This double pipe constructed of these outer pipe 101a and inner pipe 101b has a thermal insulation material (not shown) provided therein and a vacuum is produced within the double pipe. These cable cores 102 each include, in the order starting from the innermost component, a former 200, a superconductor 201, an electrical insulation layer 202, a shield layer 203, and a protection layer 204. Superconductor 201 is constructed by winding superconducting wires around former 200 in a spiral manner in layers. Shield layer 203 is constructed by winding superconducting wires similar to that of superconductor 201 around electrical insulation layer 202 in a spiral manner. In this shield layer 203, in a steady state, current is induced of almost the same magnitude as and opposite in direction to current flowing through superconductor 201. The induced current causes a magnetic field to be generated that cancels out a magnetic field generated from superconductor 201 to achieve almost zero leakage magnetic field outside cable core 102. A space 103 formed between inner pipe 101b and each cable core 102 usually provides a path where a refrigerant flows.

In a case for example where a plurality of multiphase superconducting cables are connected to each other, a multiphase superconducting cable is connected to a normal-conducting cable, or a termination structure of a multiphase superconducting cable is formed, the multiphase superconducting cable is split into respective segments of respective phases, namely cable cores. The cable is split into the cable-core segments in a splitter box kept at a cryogenic temperature and the cable cores are held within the splitter box in a state where the cable cores are spaced apart from each other. A jig for holding the cables with sufficient spaces therebetween is disclosed for example in Japanese Patent Laying-Open No. 2003-009330.

In another case for example where a plurality of multiphase normal-conducting cables are connected to each other or a termination structure of a multiphase normal-conducting cable is formed, the multiphase normal-conducting cable is also split into respective segments of the cable cores as done for the multiphase superconducting cable. Here, the normal-conducting cable is split into the cable-core segments without the above-described splitter box and thus the cable cores are spaced apart as they are. At the splitting portion of the cable, the shield layer of each cable core is usually grounded in order to obtain a ground potential for each phase. This technique is described for example in "Power Cable Technology Handbook, New Edition" by Kihachiro Iizuka, Kabushiki Kaisha Denkishoin, Mar. 25, 1989, first edition, first copy, p. 645.

As for the multiphase superconducting cable, however, it has not been known or devised how to process the shield layer of each cable core at the splitting portion and thus there is a demand for a specific method of appropriately processing the shield layer. The shield layer of each cable core at the splitting portion of the superconducting cable may be grounded like that of the normal-conducting cable as discussed above. The superconducting cable, however, allows significantly larger current to flow as compared with the normal-conducting cable, so that respective shield layers of the cable cores could be connected through the ground if the shield layers are grounded as those of the normal-conducting cable, and in that case a magnetic field generated external to each core is disadvantageously increased. If respective shield layers of the cable cores of the superconducting cable are separately grounded and the shield layers are connected through the ground, smaller current consequently flows through the shield layer than that through the superconductor due to a high electrical connection resistance between the shield layers. A resultant problem is that the shield layer of each cable core cannot produce a magnetic field large enough to cancel out the magnetic field generated from the superconductor of each core and, a large magnetic field could be generated outside each core.

SUMMARY OF THE INVENTION

An object of the present invention is to provide a phase split structure of a multiphase superconducting cable to minimize or nullify a magnetic field that could be generated outside a plurality of cable cores.

Another object of the present invention is to provide a phase split structure of a multiphase superconducting cable capable of reducing a current induced at a shield layer by a short circuit current flowing through a superconductor for example when a short circuit or other similar accident occurs.

The present invention achieves the above-described object by connecting respective shield layers of a plurality of cable cores to each other by a shield connecting portion formed of an electrically conductive material in such a manner that the shield layers are connected to each other with a low resistance.

Specifically, a phase split structure of a multiphase superconducting cable of the present invention includes a plurality of cable cores having respective shield layers provided around respective superconductors, a splitter box housing the cable cores each extending from an assembly portion in which the cable cores are assembled, the cable cores in the splitter box being spaced apart from each other, and a shield connecting portion connecting respective shield layers of the cable cores to each other in the splitter box, and the shield connecting portion is implemented by employing a superconducting material.

If respective shield layers of the cable cores of the multiphase superconducting cable are connected to each other via the ground, the connection resistance between the shield layers is high. In such a case, there arises a difficulty in generating a magnetic field by each of respective shield layers of the cable cores that can cancel out a magnetic field generated from the superconductor of each cable core. The present invention thus connects respective shield layers of the cable cores to each other with an electrically-conductive material having a lower connection resistance, a superconducting material in particular, instead of connecting the shield layers via the ground which results in a high connection resistance.

Thus in accordance with the present invention when a superconducting cable has a current flowing therethrough, electrical connection resistance between shield layers can be reduced to allow each cable core's shield layer to have flowing therethrough a current substantially equal to that which a superconductor does. Thus in accordance with the present invention a magnetic field generated from each cable core's superconductor can substantially be cancelled by that generated at each core's shield layer. A leaking magnetic field generated external to each core can further be reduced or completely eliminated. Furthermore in accordance with the present invention a shield connecting portion that is formed of a superconducting material allows reduced electrical connection resistance between the shield layers and hence a reduced amount of heat generated at the shield connecting portion by conduction, and a refrigerator can bear a reduced burden. Hereinafter the present invention will be described more specifically.

The present invention is directed to a multiphase superconducting cable having a plurality of cable cores with respective shield layers around respective superconductors. For example, the present invention is directed to a three-phase superconducting cable of three-core type having three cable cores twisted and housed in a thermal insulation pipe. The superconducting cable of the present invention may be any of known multiphase superconducting cables.

The present invention uses a splitter box for housing cable-core segments of the multiphase superconducting cable that are formed by splitting the superconducting cable into respective segments containing the cable cores. Specifically, in the splitter box, cable cores extending from an assembly portion and spaced apart from each other are housed. Here, the assembly portion refers to a portion of the multiphase superconducting cable in which a plurality of cable cores constituting the superconducting cable are assembled into the cable. The splitter box is filled with such a refrigerant as liquid nitrogen for cooling the cable cores so that the cable cores are kept in a superconducting state. Therefore, the splitter box is preferably of a thermal insulation structure.

The cable cores each in the splitter box may be held by means of a holding tool. An example of the holding tool is capable of holding each of the cable cores and capable of holding the cable cores in a state where the cable cores are spaced apart from each other. In particular, the holding tool is preferably structured to be able to move within the splitter box as the cable cores extend/contract.

According to the present invention, respective shield layers of the cable cores housed in the splitter box are connected to each other by means of a particular connecting portion, specifically, a shield connecting portion formed of an electrically-conductive material. The shield connecting portion may connect at least respective parts, with respect to the longitudinal direction, of respective shield layers of the cable cores housed in the splitter box. The shield connecting portion may be shaped in a manner that the connecting portion contacts at least respective parts, with respect to the circumferential direction, of respective shield layers of the cable cores and can connect respective shield layers of the cable cores to each other. If respective shield layers of the cable cores are each formed of a plurality of superconducting strands, the connecting portion is preferably shaped in such a manner that the connecting portion can be electrically connected to all of the constituent superconducting strands. For example, the connecting portion is shaped to have a combination of cylindrical members each capable of covering the periphery of each of respective shield layers of the cable cores and coupling members coupling the cylindrical members to each other. In the present invention such a shield connecting portion is at least partially formed of a superconducting material. For example, the cylindrical member may be formed of copper, aluminum or other similar metal facilitating an operation performed to attach the same, and the coupling member may be formed of a superconducting material. For example, cylindrical members of metal can be coupled together by a superconducting wire. Furthermore, the coupling member may be formed of copper, aluminum or other similar metal and a superconducting material used together. For example, a metal plate can have a superconducting wire longitudinally attached thereto or a pair of pieces of metal plates can be spaced and coupled by a superconducting wire.

The superconducting material can include for example a superconducting wire in the form of tape using Bi2223 phase or other similar, Bi based oxide superconductor similar to that used for superconductor, a shield layer and the like, and a superconducting wire such as a round superconducting wire used to produce the tape wire. The superconducting tape and round wires can for example be formed by the powder in tube process. More specifically, powdery source material of Bi2223 phase or other similar superconducting phase is introduced into an Ag or other similar metal pipe and then drawn and thus formed into a clad wire. A plurality of such clad wires are bundled together and introduced into an Ag or other similar metal pipe and then drawn to provide a multicore wire which is in turn thermally treated to obtain an intended superconducting phase, which serves as the round superconducting wire. If this multicore wire is rolled and thermally treated it will provide the tape wire. The round wire is advantageous in that (1) it can be produced by a process formed of a smaller number of steps than the tape wire, (2) it is round in cross section and thus has a larger structural strength than the tape wire, and (3) it can be handled and hence attached more readily than the tape wire.

When a short circuit or other similar accident occurs and a superconductor has a short circuit current flowing therethrough and a shield layer also has a large current induced therein, the large current increases the shield layer's temperature. A superconducting state may no longer be maintained and transition to a normal conducting state, or a so-called a quench may occur. Accordingly there is a demand for effectively reducing the large current induced in accidents at the shield layer. This can be addressed for example by reducing a critical current value of the shield connecting portion to be smaller than that of a shield layer of a core of a cable. When a short circuit or other similar accident occurs and the shield layer and the shield connecting portion have a large current induced therein the shield connecting portion can exceed its critical current value faster than the shield layer and subsequently cause large resistance to allow the shield layer to have a reduced current induced therein. More specifically, the shield connecting portion quenched faster than the shield layer can prevent an accidentally induced current from significantly or completely damaging the shield layer. Furthermore, if the shield connecting portion is damaged in an accident by a large current the damaged portion can readily be determined. Furthermore, simply exchanging the shield connecting portion suffices, and the accident can readily be handled.

The shield connecting portion having a critical current value smaller than the shield layer, i.e., providing higher resistance in an accident can be obtained by modifying a superconducting material used to form the same. For example, if a superconducting material formed by the powder in tube process, a reduced number of superconducting wires may be used. Furthermore, a superconducting wire having a smaller number of clad wires of multicore wire than the number of superconducting wires used for a shield layer, may be used. Furthermore, for example, a superconducting material other than that formed in the powder in tube process, more specifically a superconductor excluding Ag or a similar metal matrix as described above, and formed only of a superconducting phase, i.e., a so-called bulk superconductor may be used. The superconducting phase specifically includes the above-described Bi-based oxide superconducting phase, a rare earth oxide superconducting phase such as a composition of Re—Ba—Cu—O, and the like, wherein Re represents Y, Sm, Nd, Pr or other similar lanthanum-based element. The rare earth oxide superconducting phase can specifically have a composition including $YBa_2Cu_3Ox$, $Y_2BaCuOx$, $NdBa_2Cu_3Ox$, $Nd_4Ba_2Cu_2Ox$, $SmBa_2Cu_3Ox$, $Sm_2BaCuOx$, $PrBa_2Cu_3Ox$, $Pr_2BaCuOx$, $HoBa_2Cu_3Ox$. Such bulk conductors that do not have Ag or other similar metal interposed and are formed only of an oxide phase, tend to provide large resistance in accidents. Such bulk superconductors can readily be used in an appropriate form, such as a bar, a plate or the like.

Furthermore, the superconducting material providing high resistance in accidents includes a superconductor formed of a metal substrate and the above described Re-based superconducting layer deposited on the substrate. The metal substrate can for example be formed of Ni alloy having a high melting point. The Re-based superconducting layer can be deposited by well known CVD, PVD or the like. The metal substrate and the Re-based superconducting layer may have yttria stabilized zirconia (YSZ) or other similar intermediate layer posed therebetween. This superconductor can readily be used when the metal plate is formed in an appropriate form, for example in the form of tape.

Preferably, the shield connecting portion and the shield layers are connected with a lower electrical resistance upon the connection. For example, they are appropriately connected with solder. When the shield connecting portion is attached to the shield layer, a protection layer, if provided to each cable core, is partially removed in advance in such a way that removes a part of the protection layer where the connection is effected.

The shield connecting portion may be attached to the shield layers of the cable cores drawn out of the splitter box. Here, the cable cores extended out of the splitter box are each provided with a thermal insulation pipe filled with such a refrigerant as liquid nitrogen in order to maintain a superconducting state like that of the cable cores housed in the splitter box. Therefore, the structure of connecting the shield connecting portion to each of respective shield layers of the cable cores extended out of the splitter box is extremely complicated and thus the present invention attaches the shield connecting portion to the cores within the splitter box.

The shield connecting portion may be provided at an arbitrary position of each of the cable cores within the splitter box. If the shield connecting portion is provided at a position relatively closer to the termination of the split cable (hereinafter split termination), the cable cores are spaced further apart from each other and thus the distances between the cable cores increase. In such a case, the workability in attaching the connecting portion is improved and thus this method is preferable. In contrast, if the shield connecting portion is provided at a position relatively closer to the assembly portion, the cable cores are not substantially spaced further apart and thus the distances therebetween are smaller. In this case, the shield connecting portion can be made compact and the part of the splitter box that is located closer to the split termination can be made smaller since the connecting portion is located away from the split termination. In other words, the splitter box can be made more compact.

Preferably, the split structure of the present invention is formed not only at one end of the cable cores (superconducting cable) but at each of both ends thereof. If split structures of the present invention are provided at respective ends of the superconducting cable, respective shield layers of the cable cores in each of respective splitter boxes at respective ends of the cable are connected to each other with the shield connecting portion. Then, in each of respective shield layers of the cable cores extending from the shield connecting portion at one end of the superconducting cable to the shield connecting portion at the other end thereof, current of almost the same magnitude as and opposite in direction to current flowing in a corresponding superconductor is induced in a steady state and thus any leakage magnetic field outside the cores can be cancelled out. Most of the current of almost the same magnitude as and opposite in direction to the current flowing through the superconductor flows in a part of the shield layer that is located closer to the assembly portion with respect to the shield connecting portion. Therefore, in a part of the shield layer that is located between the shield connecting portion and the split termination, current smaller than that flowing through the superconductor merely flows. Then, if the above-mentioned thermal insulation pipe provided around each of the cable cores extended out of the splitter box is made of an electrically-low-resistance material, an eddy-current loss could occur due to a leakage magnetic field generated around the cable cores located between the shield connecting portion and the split termination. Then, in order to reduce or nullify the eddy current loss, the thermal insulation pipe is preferably formed of a high-resistance material or insulation material. The high-resistance material preferably has a specific resistance $\rho$ from a room temperature to a low temperature of approximately 77 K is at least $10^{-5} \Omega \cdot cm$. An example of the high-resistance material is stainless (specific resistance $\rho = 4 \times 10^{-5} \Omega \cdot cm$ to $8 \times 10^{-5} \Omega \cdot cm$). An example of the insulation material is FRP (Fiber Reinforced Plastics).

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will now be described.

First Embodiment

Figure 1:
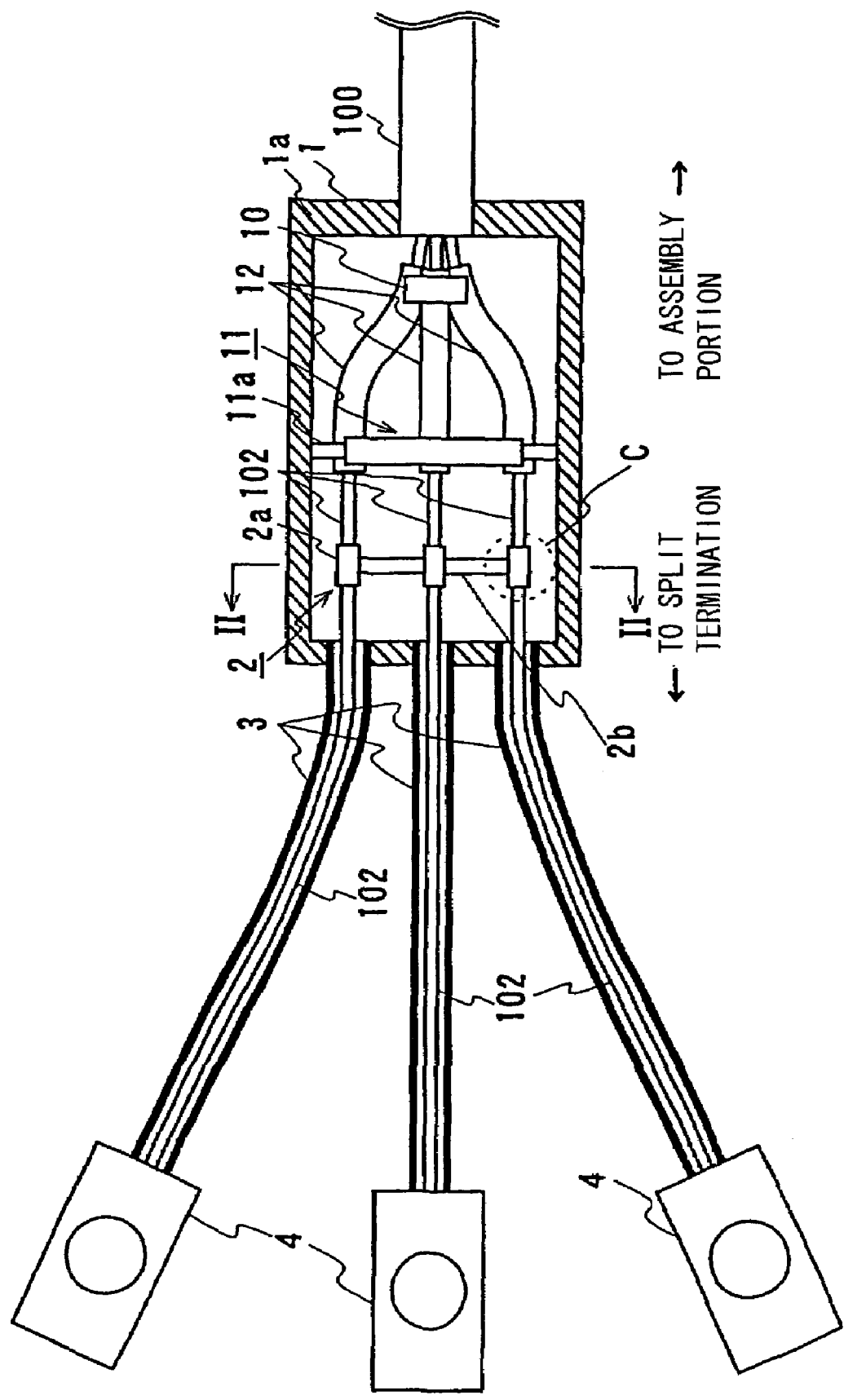
FIG. 1 schematically shows a phase split structure of a multiphase superconducting cable of the present invention that has a shield connecting portion located relatively closer to a split termination.

This embodiment and a second embodiment described hereinafter are described in connection with an example of a phase split structure of a three-phase superconducting cable 100 having three cable cores 102 as shown in FIGS. 1 and 4.

Referring to FIG. 1, the present phase split structure includes three cable cores 102 each having a shield layer provided around a superconductor, a splitter box 1 housing cable-cores 102 in a state in which cable cores 102 extending from an assembly portion where three cable cores 102 are assembled into the superconducting cable are spaced apart from each other, and a shield connecting portion 2 connecting respective shield layers of cable cores 102 to each other in splitter box 1.

Figure 5:
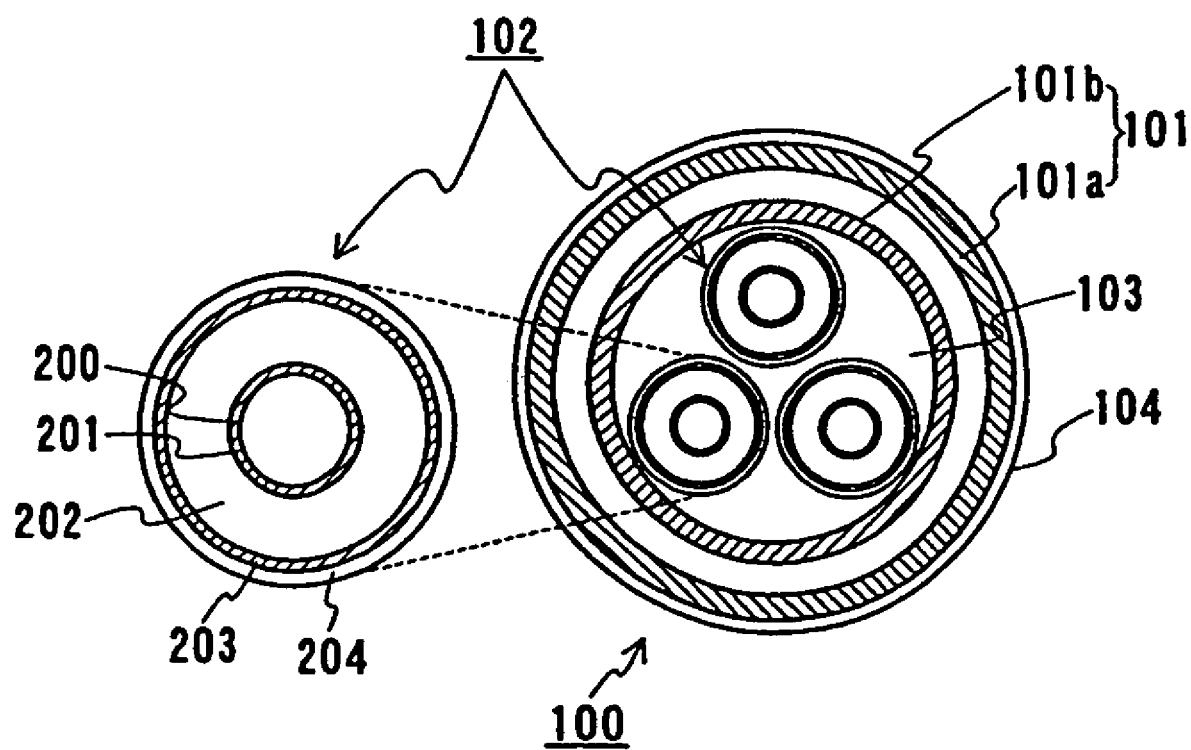
FIG. 5 is a cross-sectional view of a three-phase superconducting cable of three-core type.

Three-phase superconducting cable 100 of this embodiment has the same structure as that shown in FIG. 5. Specifically, three-phase superconducting cable 100 is structured by twisting three cable cores 102 and housing them in thermal insulation pipe 101, the cable cores each including, in the order starting from the innermost component, former 200, superconductor 201, electrical insulation layer 202, shield layer 203 and protection layer 204. Former 200 is constructed by twisting a plurality of copper wires each coated with an insulator. Superconductor 201 is constructed by winding in spiral manner Bi2223-based superconducting tape-shaped wires (Ag—Mn sheath wires) in layers around former 200. Shield layer 203 is constructed by winding in spiral manner Bi2223-based superconducting tape-shaped wires (Ag—Mn sheath wires) in layers around electrical insulation layer 202. Electrical insulation layer 202 is constructed by winding polypropylene laminated paper (PPLP (R) manufactured by Sumitomo Electric Industries, Ltd.) around superconductor 201. Protection layer 204 is constructed by winding kraft paper around shield layer 203. Thermal insulation pipe 101 has outer pipe 101a and inner pipe 101b each formed of an SUS corrugated pipe. The double pipe constituted of outer pipe 101a and inner pipe 101b has a thermal insulation material therein provided in layers and a vacuum is produced within the double pipe to accomplish a vacuum multilayer thermal insulation structure. Further, anticorrosion layer 104 of polyvinyl chloride is provided around thermal insulation pipe 101.

Three-phase superconducting cable 100 having twisted cable cores 102 assembled thereinto is split into respective segments of cable cores 102 by spacing cable cores 102 apart from each other so that cable cores 102 are handled separately. Splitter box 1 houses these three cable cores 102 spaced apart from each other. Thus, superconducting cable 100 is inserted from one side of splitter box 1 (the right side in FIG. 1) and, from the other side thereof (the left side in FIG. 1) opposite to that one side, cable cores 102 split from the cable protrude. The inside of splitter box 1 is filled with such a refrigerant as liquid nitrogen for cooling cable cores 102 having refrigerant therein. Splitter box 1 thus has a thermal insulation structure with a thermal insulation layer 1a. Splitter box 1 of this embodiment is cylindrical in shape.

Cable cores 102 housed in splitter box 1 extend from one side of splitter box 1 (from the assembly portion of superconducting cable 100) toward the other side of splitter box 1 (toward split termination of cores 102) with spaces between cores 102 that gradually increase to become constant. Cable cores 102 of this embodiment are held by a first holding tool 10 holding the cores at a position relatively closer to the assembly portion, a second holding tool 11 holding the cores at a middle position, and intermediate holding tools 12 holding cores 102 between first holding tool 10 and second holding tool 11.

First holding tool 10 has an annular central portion and three intermediate holding tools 12 are fixed to the outer periphery of the annular portion. First holding tool 10 is provided between cable cores 102 in such a manner that the center of the annular portion is substantially located at the center of the space enclosed by three cable cores 102. Cable cores 102 are provided at respective intermediate holding tools 12 so that intermediate holding tools 12 hold cable cores 102 spaced apart from each other.

The basic structure of second holding tool 11 is almost similar to that of first holding tool 10 and different therefrom only in that the diameter of the annular portion is made larger than that of first holding tool 10. In this embodiment, a sliding portion 11a is provided that is substantially in point contact with the inner peripheral surface of splitter box 1 so as to be movable in splitter box 1 as cable cores 102 extend/contract. Sliding portion 11a is attached to any part on the outer periphery of the annular portion where intermediate holding tools 12 are not fixed.

Intermediate holding tools 12 are each cylindrical in shape constructed by combining semi-arc members, namely so-called canaliculate members. In this embodiment, paired canaliculate members cover the outer periphery of cable core 102 and the outer periphery of the canaliculate members is attached to the outer periphery of cable core 102 with some tightening tool like a band (not shown) to hold cable core 102 therein. Intermediate holding tool 12 may have some through holes appropriately provided therein to facilitate contact between cable core 102 in intermediate holding tool 12 and the refrigerant.

Figure 2A:
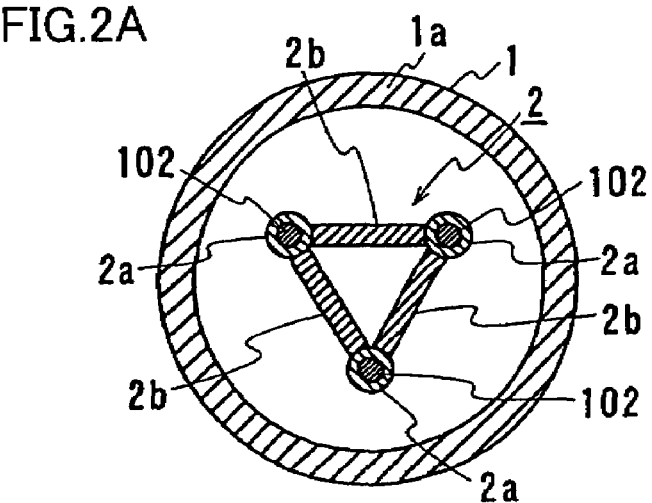
FIG. 2A is a cross-sectional view along line II—II in FIG. 1.
Figure 2B:
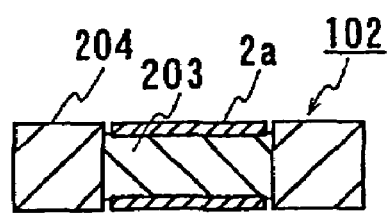
FIG. 2B is a cross-sectional view of a part of a cable core that is in region C shown in FIG. 1.
Figure 2C:
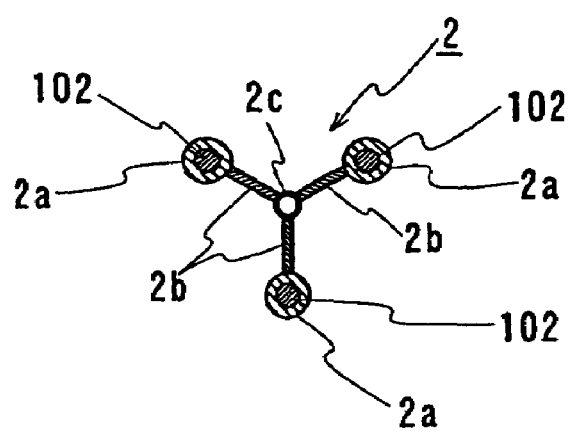
FIG. 2C is a cross-sectional view of a shield connecting portion of another form.

A feature of this embodiment is in the structure connecting respective shield layers of cable cores 102 to each other with shield connecting portion 2. More specifically in accordance with the present invention each cable core 102 has a shield layer forming a closed loop via shield connecting portion 2. In this embodiment, respective shield layers of cable cores 102 located relatively closer to the split termination with respect to second holding tool 11 are connected to each other by shield connecting portion 2. In this embodiment shield connecting portion 2 includes cylindrical members 2a covering respective outer peripheries of shield layers 203 of cable cores 102 and coupling members 2b coupling cylindrical members 2a to each other, as shown in FIGS. 2A–2C.

Cylindrical members 2a are each constructed of a pair of semi-arc members matching in shape to the outer shape of cable core 102 so that attachment of cylindrical member 2a to the outer periphery of shield layer 203 of each cable core 102 is facilitated. The semi-arc members are thus combined to cover the outer periphery of shield layer 203. More specifically, as shown in FIG. 2B, protection layer 204 of cable core 102 is partially removed to partially expose shield layer 203, and the paired semi-arc members are provided over the exposed part of shield layer 203 to cover cable core 102. In this embodiment cylindrical members 2a are made of copper. In this embodiment the paired semi-arc members are connected with solder. Alternatively they may be connected by means of such coupling members as bolts. In addition, each cylindrical member 2a and shield layer 203 of cable core 102 are also connected with solder. Cylindrical member 2a is thus brought into contact with superconducting tape-shaped wires constituting shield layer 203.

Coupling members 2b connect cylindrical members 2a to each other and are provided between cable cores 102, and, as well as cylindrical member 2a, formed of copper. In this embodiment, three coupling members 2b are employed, cylindrical members 2a are connected to respective ends of each coupling member 2b, and accordingly shield connecting portion 2 is formed as shown in FIG. 2A in the shape of a triangle with cylindrical members 2a at respective apexes (Δ connection type). In this embodiment, coupling members 2b and cylindrical members 2a are connected with solder. Alternatively, they may be connected by means of such coupling members as bolts. Further, as shown in FIG. 2C, shield connecting portion 2 may be constructed to have a central member 2c provided at the center of a triangle with cylindrical members 2a at respective apexes and have coupling members 2b connecting central member 2c to respective cylindrical members 2a (Y connection type).

The coupling member specifically has a structure as described hereinafter. FIG. 3A shows by way of example a coupling member in the form of a plate including a copper plate 20 and a superconducting wire 21 longitudinally attached and soldered and thus bonded thereon. In this example, superconducting wire 21 is formed in a powder in tube process. More specifically, a powdery source material formed of Bi2223 phase is introduced into an Ag pipe and then drawn to be a clad wire. A plurality of such clad wires are bundled together and introduced into an Ag pipe, and then drawn to be a multicore wire which is in turn rolled and thermally treated to provide a tape wire, which is used as superconducting wire 21.

Figure 3B:
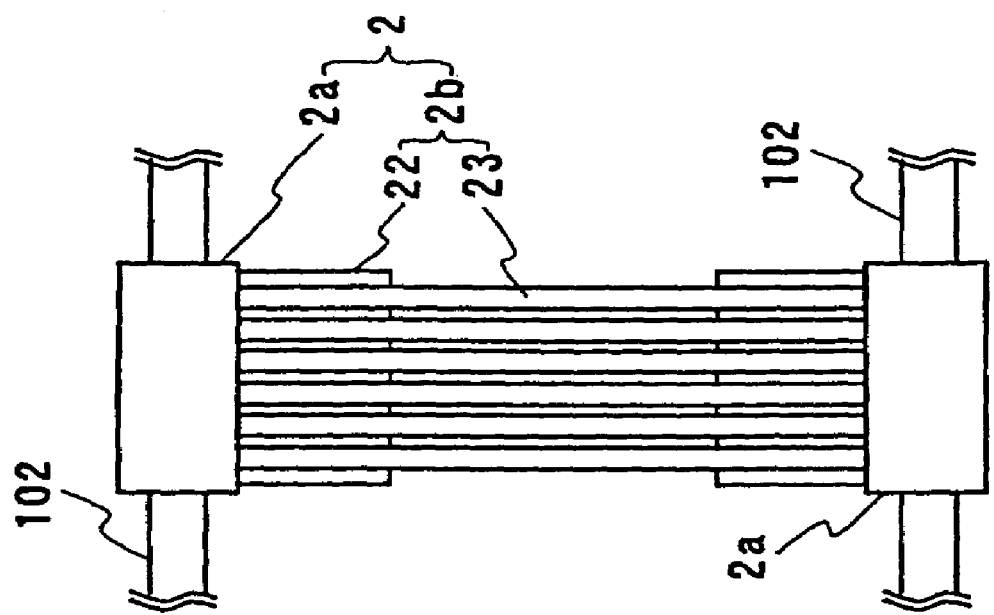
FIGS. 3A and 3B generally show as enlarged a portion of a coupling member of a shield connecting portion of a phase split structure of a multiphase superconducting cable of the present invention, FIG. 3A showing an example of the coupling member with a copper plate having a superconducting wire longitudinally attached thereto, FIG. 3B showing an example of the coupling member with a pair of pieces of copper plates spaced and connected together by a superconducting wire.
Figure 3A:
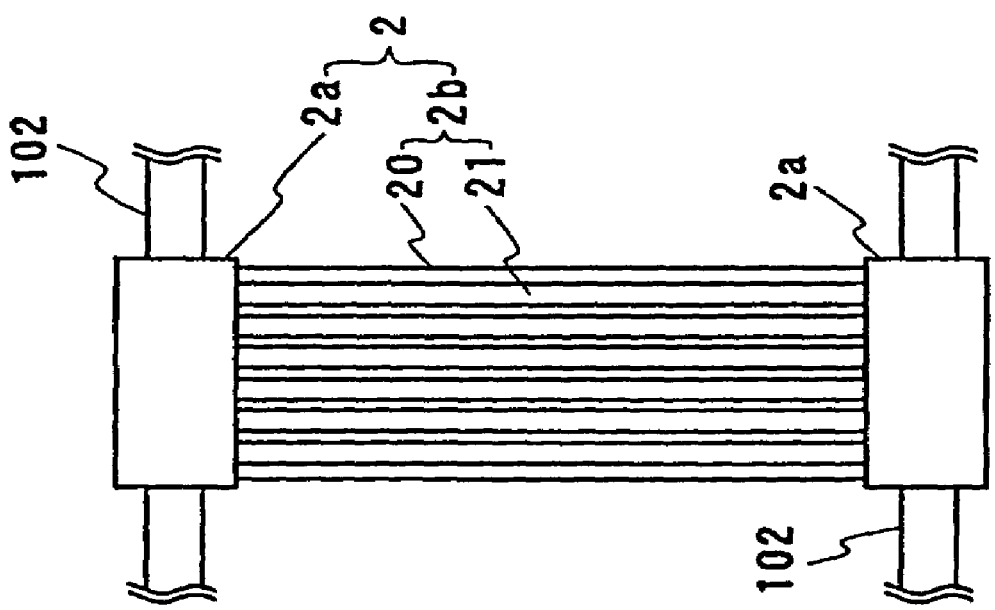

FIG. 3B shows by way of example a coupling member including a pair of pieces of copper plates 22 and a superconducting wire 23 arranged in parallel and having opposite ends soldered and thus bonded to pieces 22. In this example, superconducting wire 23 is a round wire obtained by thermally treating a multicore wire formed in a powder in tube process as has been described above. As shown in this example, coupling member 2b can have an intermediate portion formed only of superconducting wire 23, allowing a smaller electrical connection resistance of shield connecting portion 2 than in the FIG. 3A example. Furthermore, using the round wire allows large mechanical strength inspite that coupling member 2b has an intermediate portion formed of superconducting wire 23 alone. Note that the round wire may be replaced with a tape wire similar to that as described above. In doing so, a plurality of tape wires may be stacked in layers and soldered together to provide increased strength.

According to this embodiment, thermal insulation pipe 3 is provided around each cable core 102 drawn from splitter box 1, thermal insulation pipe 3 is constructed of an insulating material implemented by FRP, and thermal insulation pipe 3 is filled with a refrigerant as splitter box 1. Thus, cable cores 102 each extending from splitter box 1 can be kept in the superconducting state. Furthermore thermal insulation pipe 3 formed of insulating FPR can prevent an eddy current from readily occurring if a leaking magnetic field is generated at an outer periphery of cable core 102 extending from shield connecting portion 2 to terminal portion 4. The split termination of each cable core 102 is provided with terminal portion 4 connectable to another cable core or connection equipment. This is also of a second embodiment hereinlater described.

The phase split structure of the superconducting cable constructed as described above has shield connecting portion formed of a superconducting material connecting respective shield layers of cable cores, so that these shield layers are short-circuited to each other when current flows through the cable. Specifically, since the shield layers are connected with a low connection resistance therebetween, the magnitude of current flowing through each shield layer can be made substantially equal to that of current flowing through superconductors each. A magnetic field can thus be generated in each of the shield layers that can cancel out a magnetic field generated from each of the superconductors and accordingly generation of a large magnetic field outside cable cores can be reduced. Furthermore the shield connecting portion formed of a superconducting material allows a significantly reduced electrical connection resistance between the shield layers and hence a reduced amount of heat generated at the shield connecting portion by conduction. A refrigerator can be free from a significantly excessive burden.

Further, according to this embodiment, the shield connecting portion is attached at a location relatively closer to the split termination, so that the shield connecting portion can easily be attached at the location where cable cores are sufficiently spaced apart from each other.

Second Embodiment

Figure 4A:
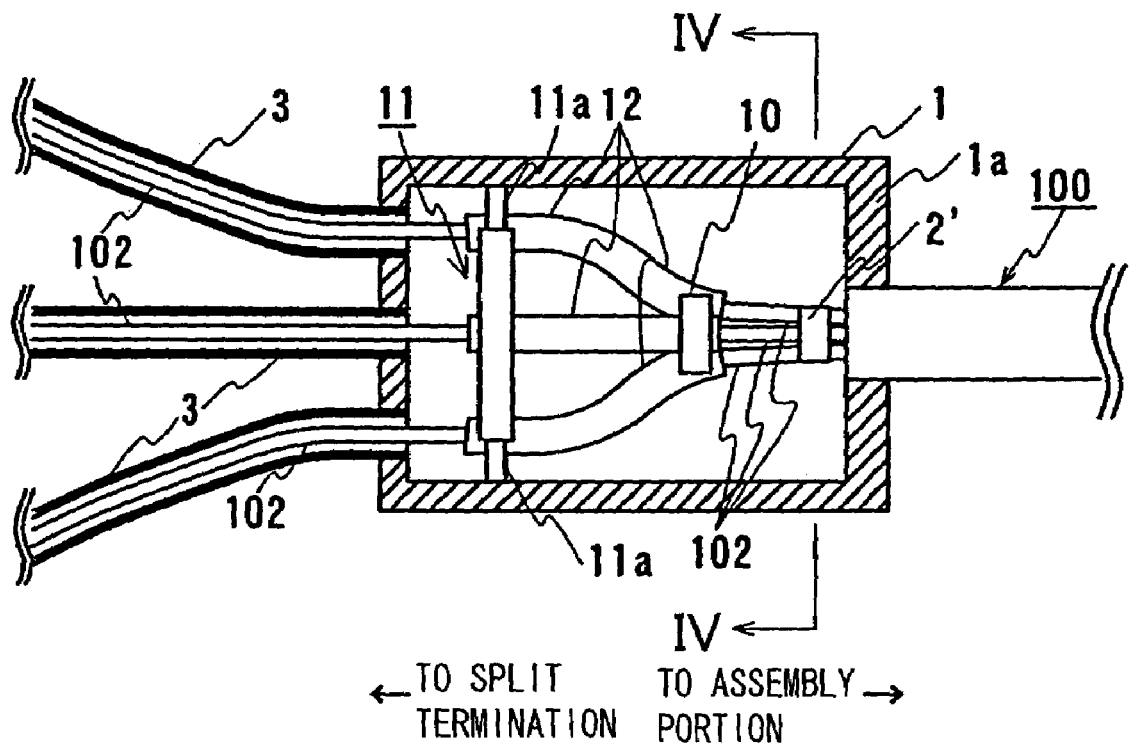
FIG. 4A schematically shows a phase split structure of a multiphase superconducting cable of the present invention that has a shield connecting portion located relatively closer to an assembly portion.

In FIG. 4A the terminal portion is not shown. The present phase split structure basically has a structure similar to that described in the first embodiment except that a shield connecting portion 2' is provided relatively closer to an assembly portion with respect to second holding tool 11, which is described in detail below.

Figure 4B:
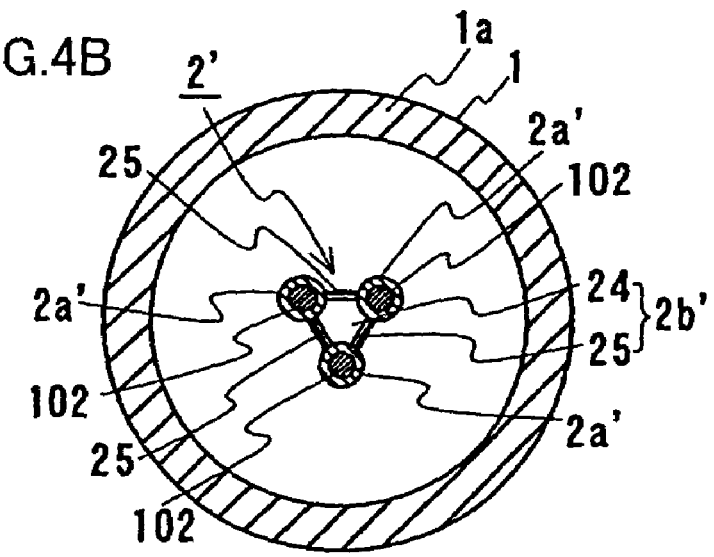
FIG. 4B is a cross-sectional view along line IV—IV in FIG. 4A.

Shield connecting portion 2' of this embodiment includes, as shown in FIG. 4B, cylindrical members 2a' covering respective peripheries of shield layers respectively of a plurality of cable cores 102 as well as a coupling member 2b' coupling these cylindrical members 2a' to each other. Cylindrical members 2a' of this embodiment, like those of the first embodiment, are each formed of a pair of semi-arc members of copper. Semi-arc members of cylindrical member 2a' are provided around a corresponding shield layer exposed by partially removing protection layer 204 of cable core 102 and are connected with bolts to cover cable core 102. Cylindrical members 2a' are each connected to corresponding one of shield layers 203 of respective cable cores 102 with solder.

Coupling member 2b' in this embodiment connects these cylindrical members 2a' to each other and is provided between cable cores 102. Coupling member 2b' is formed of a triangular-prism-shaped material having its parts corresponding to respective apexes of the triangular cross section that are each cut out in the shape of an arc, and made of copper as cylindrical members 2a'. In this embodiment, the cut-out parts of coupling member 2b' are each connected with corresponding one of cylindrical members 2a' to form shield connecting portion 2' having a triangular cross section with respective apexes on which cylindrical members 2a' are provided as shown in FIG. 4B (Δ connection type). Although coupling member 2b' and cylindrical members 2a' are connected with solder in this embodiment, they may be connected with such coupling members as bolts.

The above described coupling member specifically has a configuration as described hereinafter. In this embodiment, as shown in FIG. 4B, a copper plate 24 and a superconducting wire 25 arranged thereon are soldered and thus bonded together. Superconducting wire 25 is arranged to couple a cylindrical member 2a', i.e., to form a triangle as shown in FIG. 4B. In this example, superconducting wire 25 is a tape wire formed in a powder in tube process similarly as has been described in the first embodiment.

Phase split structure of the superconducting cable structured as described above has a shield connecting portion formed of a superconducting material which connects respective shield layers of a plurality of cable cores to each other, so that the connection resistance between the shield layers can be lowered when current is flown through the cable, as accomplished by the first embodiment. Accordingly, the magnitude of current flowing through the shield layers each is made substantially equal to the magnitude of current flowing through each of the superconductors, and thus a magnetic field generated from the superconductors can be cancelled out by the magnetic field generated in the shield layers. In this way, occurrence of a large magnetic field outside the cable cores can effectively be reduced. The shield connecting portion formed of the superconducting material allows reduced electrical connection resistance of the shield layers and hence a reduced amount of heat generated at the shield connecting portion by conduction, and a refrigerator can be free from a significantly excessive burden.

Further, since the shield connecting portion of this embodiment is provided relatively closer to the assembly portion, the distance between cable cores is relatively shorter. Then, the shield connecting portion can be made small and the space located relatively closer to the split termination with respect to the second holding tool in the splitter box can be made smaller. In this way, the splitter box can be made compact.

Third Embodiment

In the first and second embodiments a superconducting wire formed in a power in tube process, i.e., a superconductor formed of a superconducting phase and a metal has been used to implement a shield connecting portion. In this embodiment will be described an example employing a shield connecting portion that has a basic structure similar to that described in the first embodiment and employs a superconductor formed only of a superconducting phase. More specifically, it corresponds to the FIG. 1 example with superconducting wire 23 (see FIG. 3B) formed of a bulk superconductor of Bi2223 oxide superconducting phase. In this embodiment the bulk superconductor is used in the form of a bar.

As described in this embodiment, the shield connecting portion includes a coupling member formed of a bulk superconductor that does not have silver or other similar metal interposed. Furthermore, the bulk superconductor is not arranged on a copper plate or the like longitudinally. This allows a smaller critical current value and a larger normal conducting resistance than a shield layer formed of Bi2223-based superconducting tape wire (an Ag—Mn sheath wire). When a short circuit or other similar accident occurs and the superconductor has a short circuit current flowing therethrough the shield connecting portion can exceed a critical current value faster than the conductor and thus provide large resistance to reduce a current induced from the conductor to the shield layer. The shield layer can thus be protected from a significant damage attributed to a current introduced by an accident. Furthermore if in the accident the shield connecting portion is damaged by a short circuit current it can readily be confirmed which portion is damaged and simply exchanging the damaged portion or the shield connecting portion suffices. The accident can readily be handled.

Fourth Embodiment

Hereinafter will be described an example employing a shield connecting portion that has a basic configuration similarly as has been described in the second embodiment and employs a Re-based oxide conductor. More specifically, it corresponds to the FIG. 4 example with copper plate 24 replaced with an Ni alloy plate, more specifically Hasteroy (a registered trademark owned by Haynes Stellite Co.) with a $YBa_2Cu_3Ox$ film deposited on this alloy plate by well known PVD.

As shown in this embodiment, the shield connecting portion is formed of rate earth superconductor. Accordingly, if short circuit or other similar accident occurs and the superconductor has a short circuit current flowing therethrough the shield connecting portion's resistance can be increased similarly as has been described in the third embodiment and the shield layer can thus have a reduced induced current. If an accident occurs and a current flows the shield layer is not significantly damaged. Furthermore if in the accident the shield connecting portion is damaged by a short circuit current it can readily be confirmed which portion is damaged and simply exchanging the damaged portion or the shield connecting portion suffices. The accident can readily be handled. Furthermore, the superconducting layer can be formed by deposition, and the substrate can be changed in geometry as desired and the coupling member can be formed in any geometry.

Thus, as has been described above, the present superconducting cable's phase split structure allows cable cores to have their respective shield layers connected by a conductive material to achieve a significantly reduced electrical connection resistance between the shield layers and when the superconductor has a current passing therethrough the shield layer can have flowing therethrough a current substantially equal in magnitude and opposite in direction to that which the conductor passes to effectively cancel a magnetic field generated by the current flowing through the conductor. Thus the present invention can effectively prevent a large magnetic field from being generated external to the cable core.

Furthermore, the shield connecting portion can have a critical current value smaller than the cable core's shield layer. If a short circuit or other similar accident occurs, the shield connecting portion exceeding the critical current value can provide a large resistance to reduce a current induced at the shield layer. Thus the present invention can prevent an accidentally induced large current from significantly or completely damaging the shield layer. Furthermore if the shield connection portion is damaged in an accident by a large current which portion is damaged can readily be determined and the shield connecting portion can readily be exchanged.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A phase split structure of a multiphase superconducting cable, comprising:
   a plurality of cable cores having respective shield layers provided around respective superconductors;
   a splitter box housing said plurality of cable cores extending from an assembly portion in which said cable cores are assembled into the superconducting cable, said cable cores in said splitter box being spaced apart from each other; and
   a shield connecting portion connecting said respective shield layers of said cable cores to each other in said splitter box, said shield connecting portion being formed using a superconducting material;
   wherein the shield connecting portion includes cylindrical members covering respective outer peripheries of the shield layers of the cable cores and coupling members coupling the cylindrical members to each other; and
   wherein the shield connecting portion is formed of an element different from the shield layer.

2. The structure of claim 1, wherein said shield connecting portion has a critical current value smaller than that of said shield layer.

* * * * *